United States Patent
Villaret et al.

(10) Patent No.: US 6,759,973 B2
(45) Date of Patent: Jul. 6, 2004

(54) HIGH RESOLUTION POSITION SENSOR

(75) Inventors: Yves Villaret, Hadera (IL); Shmuel Prokopets, Ramat Gan (IL)

(73) Assignee: Yaskawa Eshed Technology Ltd., Rosh Haáyin (IL)

( * ) Notice: Subject to any disclaimer, the term of this patent is extended or adjusted under 35 U.S.C. 154(b) by 0 days.

(21) Appl. No.: 10/275,664

(22) PCT Filed: May 7, 2001

(86) PCT No.: PCT/IL01/00405

§ 371 (c)(1),
(2), (4) Date: May 21, 2003

(87) PCT Pub. No.: WO01/86360

PCT Pub. Date: Nov. 15, 2001

(65) Prior Publication Data

US 2004/0012507 A1 Jan. 22, 2004

(30) Foreign Application Priority Data

May 8, 2000 (IL) .................................................. 136016

(51) Int. Cl.⁷ .................................................. H03M 1/22

(52) U.S. Cl. ............................. 341/11; 341/13; 377/24; 702/149; 324/207.24; 324/161

(58) Field of Search ............................. 341/11, 13, 15; 377/15–17, 24, 39; 324/207.24, 207.25, 161, 166, 178; 702/149, 150, 151, 158, 163

(56) References Cited

U.S. PATENT DOCUMENTS

| | | | | |
|---|---|---|---|---|
| 4,529,964 A | * | 7/1985 | Minami et al. | 341/13 |
| 4,985,859 A | * | 1/1991 | Rauner et al. | 702/149 |
| 5,058,145 A | * | 10/1991 | Hauck et al. | 377/17 |
| 5,077,507 A | * | 12/1991 | Mitani et al. | 318/569 |
| 5,138,640 A | * | 8/1992 | Fleck et al. | 377/39 |
| 5,978,436 A | * | 11/1999 | Lohse et al. | 377/17 |

\* cited by examiner

Primary Examiner—Howard L. Williams
(74) Attorney, Agent, or Firm—Edward Langer; Shiboleth, Yisraeli, Roberts, Zisman & Co.

(57) ABSTRACT

A high-resolution position sensor device for use in precise positioning of servomechanisms, by providing increased resolution using of an encoder mounted on the shaft of a motor, which produces transition pulses through a light-sensitive arrangement using a photodetector. Each time the pulse makes a transition because the groove of the encoder wheel has passed, a reset signal is produced which resets to zero the number of clock pulses which have been measured for that interval between the transition pulses. The transition pulses and the time between them changes with changes in motor speed, while the system clock pulse rate remains fixed. The invention provides a more accurate position sensor, which operates by generating more transition pulses than the encoder itself actually generates. If the encoder produces transition pulses at a given resolution, the sensor device produces output pulses having a higher resolution. The time interval between two high-resolution pulses is smaller than that between two transition pulses, because of the higher counting rate. This provides higher resolution of the motor position information, and better position control can be achieved with smaller errors.

13 Claims, 3 Drawing Sheets

Fig: 1

HIGH RESOLUTION POSITION SENSOR

FIELD OF THE INVENTION

The present invention relates to motor and position control systems and equipment therefor, and more particularly, to a high resolution position sensor device and method for increasing the precision of position feedback during movement.

BACKGROUND OF THE INVENTION

The prior art includes numerous examples of position sensor devices which output electrical pulses as a function of displacement. Examples of these include the device described in U.S. Pat. No. 3,748,486 to Russell, which uses a diffraction grating mounted on a movable machine part for modulating light passing to a photo-electric transducer to produce electrical signals in phase with the movement of the machine part.

In U.S. Pat. No. 3,794,899 to Breslow, there is disclosed a system for evaluating errors in high precision encoders applied to servo control systems. U.S. Pat. No. 4,023,085 to Bishop et al. discloses a numerical control system having a digitized phase loop which uses a resolver providing a digital position feedback signal, to generate an error signal.

U.S. Pat. No. 4,095,158 to Matsumoto discloses a position-controlling system using a resolver to produce a position feedback signal as phase data which is converted into a reference counter and stored in a buffer register, for use in developing a position error signal for driving a servomechanism.

In U.S. Pat. No. 4,503,372 to Nozawa et al., a position control system is disclosed in which error storage means computes an error corresponding to the difference between a command value and the amount of movement sensed by a position sensor mounted on the motor shaft of a movable machine element.

U.S. Pat. No. 5,254,919 to Bridges et al. discloses an encoder system for position control, in which an optical system images encoder segments onto individual sensor elements of a linear array, such as a charge-coupled device sensor, to produce digital signals for a closed loop feedback position controller. Spacing of the sensor, elements with a relatively fine pitch along the array enables a high resolution to be achieved, but this is still insufficient for high precision position control systems.

In servomechanism applications requiring position and speed control for moving parts, or where mechanical synchronization is required, it would be desirable to provide smoother and more precise control by increasing the precision of the position feedback.

In particular, in servo control systems, the control performance is dependent on the position feedback precision. Usually when the system is at rest, servo mechanisms are able to maintain the system at the desired position, within the precision of the position sensor. However, during movement, the precision of the control is worse and an error between the command position and the actual position is observed (tracking error). The lack of precision of the encoder is very often the main factor that limits the performance of the servo system during movement.

SUMMARY OF THE INVENTION

Accordingly, it is principal object of the invention to overcome the disadvantages of prior art position control systems and provide a high resolution position sensor device for use in precise positioning of servomechanisms in many applications.

In accordance with a preferred embodiment of the present invention, there is provided a sensor device for measuring a changing variable of a system and providing output values representing the system variable with increased resolution, said device comprising:

means for providing a pulse with each transition of the measured variable over a level of each of a set of regularly spaced apart predetermined levels, means for generating a train of system clock pulses at a first rate and a train of divided system clock pulses at a fraction of said first rate;

first means for counting a first number of pulses of said divided system clock pulse train occurring between each occurrence of said transition pulse;

means for storing said first counted number of pulses of said divided system clock pulse train;

second means for counting a second number of pulses of said divided system clock pulse train, and resetting said second counted number upon each transition pulse;

second means for storing said second counted number of pulses of said divided system clock pulse train, in a register at a shifted storage position representing a multiple of said second counted number of pulses;

means for repeatedly comparing, at a relatively high rate, said shifted, stor d second counted number and said stored first counted number and producing a difference count therebetween if the former exceeds the latter;

means for generating a high resolution pulse upon replacing said shifted, stored second counted number with said difference count in said register thus providing several high resolution pulses between transition pulses; and means for calculating the system variable by counting the number of high resolution pulses in the interval between occurrences of said transition pulses.

In the preferred embodiment, the sensor device is provided as a position sensor, providing increased resolution by use of an encoder mounted on the shaft of a motor which produces transition pulses through a light-sensitive arrangement using a photodetector. Each time the pulse makes a transition because the groove of the encoder wheel has passed, a reset signal is produced which resets to zero the number of clock pulses which have been measured for that interval between the transition pulses.

The transition pulses and the time between them changes with changes in motor speed, while the system clock pulse rate remains fixed. The invention provides a more accurate position sensor which operates by generating more transition pulses than the encoder itself actually generates.

Thus, if the encoder produces transition pulses at a given resolution, the sensor device produces output pulses having a higher resolution. If for example, the position sensor is a shaft-mounted encoder delivering N pulses per revolution, the inventive sensor device can deliver, on average, N×P pulses per revolution. P is a multiplier, which is set preferably as a power of 2, i.e. $P=2^r$.

At every transition pulse of the position sensor, the time between the last two pulses is calculated, and a corresponding rate of pulses is calculated.

The pulses resulting from the multiplication that have occurred between each transition pulse are counted, and this information is provided as a stored number which is recorded in an interval latch register. The number of system clock pulses occurring between transition pulses changes in accordance with the speed of rotation of the motor. If the motor rotates more slowly, more system clock pulses are counted before the next transition pulse, and if the motor rotates more quickly, fewer system clock pulses are counted before the next transition pulse.

In addition to counting the system clock pulses, a different counter is used to count at a higher rate, so that one system clock pulse is counted as "P" clock pulses. This counter counts in the fashion of P, 2P, 3P etc., and P is an arbitrary value of a fixed rate that is chosen.

The accumulated total in the counter which is counting at the higher rate is repetitively compared with the number of pulses in the latch register, and this comparison is performed to see if it exceeds this total number of system clock pulses which was stored in the latch register. When the accumulated total of counted pulses exceeds the amount of pulses stored in the latch resister, the value of the difference over the amount of pulses stored in the counter is used to replace the value in the counter. This subtraction is performed for the purpose of resetting the counter, while continuing to count the system clock pulses, at the higher rate which is chosen. Each time this reset occurs in the counter because it has exceeded the number of pulses stored in the latch register, a high resolution pulse is generated with the replacement of the value in the counter.

The time interval between two high resolution pulses is smaller than that between two transition pulses, because of the higher counting rate. This provides higher resolution of the motor position information, and better position control can be achieved with smaller errors.

The same principle that is applied for measurement of the motor position in one motor rotation direction, can be applied to the measurement when made in the opposite motor rotation direction.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements throughout, and in which.

DETAILED DESCRIPTION OF THE PREFERRED EMBODIMENTS

Figure 1:
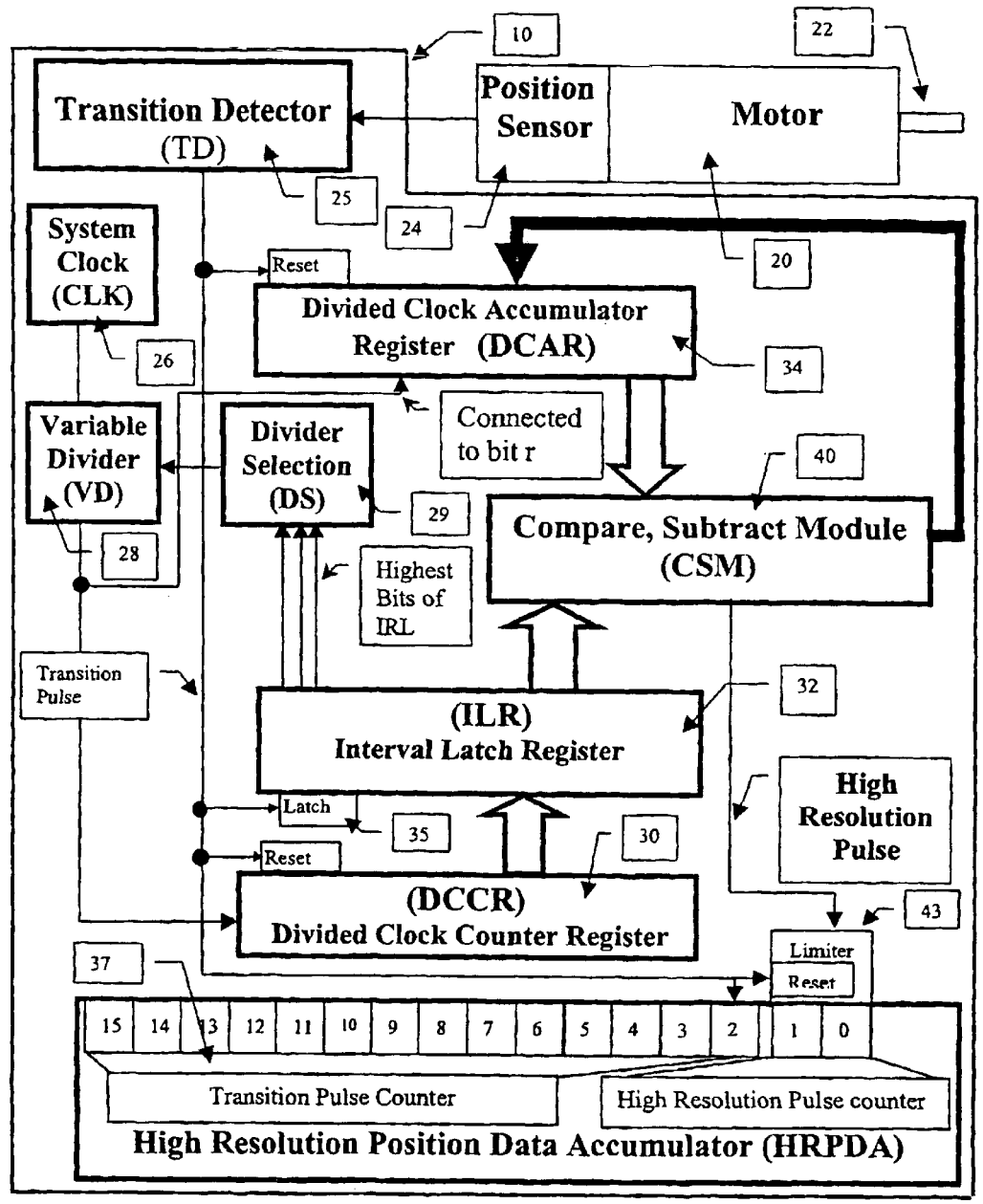
FIG. 1 is block diagram of a preferred embodiment of a high resolution position sensor device, constructed and operated in accordance with the principles of the present invention.

Referring now to FIG. 1, there is shown a block diagram of a high resolution position sensor device 10 in a preferred embodiment, constructed and operated in accordance with the principles of the present invention. In the preferred embodiment, the device 10 is applied to a motor 20 which has mounted on its shaft 22 a position sensor 24. A transition detector 25 receives signals from position sensor 24 (encoder), and provides output pulses representing the angle of rotation of the motor shaft 22, by use of a light-sensitive arrangement using a photodetector, which detects each time a transition is made when the groove of the encoder wheel has passed. These output pulses of transition detector 25 are herein described as transition pulses.

System 10 comprises a system clock pulse generator 26, which feeds a variable divider circuit 28, and also comprises a set of counting registers 30, 32 and 34, which provide counting and storing functions of data in a binary format and are thus provided as a number of bit memories. The first of these is divided clock counter register (DCCR) 30, which counts the divided clock pulses generated by variable divider circuit 28. Every pulse from the transition detector 25 resets it, so that at every transition pulse this counter starts from zero and counts the divided clock. The value stored in this counter regularly increases with time until the next transition pulse occurs. Thus, the DCCR 30 contains a number which represents the elapsed time from the last transition pulse, measured in divided clock pulses.

Also at every pulse of the transition detector 25, and just before DCCR 30 is reset, the value of accumulated counts in the DCCR 30 is copied and saved by operation of latch 35 in the internal latch register (ILR) 32. In this way, ILR 32 always contains the time interval between the last two transition pulses detected by transition detector 25, with the time interval measured in divided clock pulses. Thus, at the same time the DCCR 30 is reset to zero, the ILR 32 saves the count reached by the divided clock pulses in the previous period. When the next period begins, the ILR 32 is updated with the new value of the count of the previous period at each transition pulse, and it saves this value.

In addition to the DCCR 30 and ILR 32 registers, there is provided a divided clock accumulator register (DCAR) 34. This register receives at its input the divided clock pulses from variable divider circuit 28. It counts at a rate higher than the divided clock pulse rate, by a multiplication factor P ($P=2^r$), so that the actual value contained in this register is the number of divided clock pulses multiplied by $P=2^r$. Thus, at each divided clock pulse, the DCAR 34 count is increased by $2^r$. If for example, r=2, then the multiplication factor is P=4. In the preferred embodiment, this is done by feeding the divided clock pulse to the DCAR 34 register at bit r.

In addition to registers DCCR 30, ILR 32 and DCAR 34, there is provided a high resolution position data accumulator (URPDA) 37, and a compare and subtract module (CSM) 40. The CSM module 40 receives as input the value of the DCAR 34 register, and the value of the ILR 32 register. It repetitively compares, at a relatively high rate, the two of these values by subtracting: Value of DCAR Value of ILR.

If the subtraction operation produces a positive value, then one high resolution pulse is generated by the CSM module 40, and the result of the subtraction is written into the DCAR 34 to replace the previous value. Also, the HRPDA 37 increases its count by one.

Ideally, it would be desirable that when DCAR 34 reaches the value of ILR, then a high resolution pulse is generated and the DCAR 34 is started from zero. However, in reality, the value of the subtraction will not be zero because of two factors:

1) the detection of a positive value, causing the generation of a high resolution pulse, is not instantaneous, and there is a delay until the CSM module 40 subtracts and sends back the resulting value to be written in DCAR 34. This delay is caused by the physical limitation of the CSM module 40, in performing the comparison and subtraction.

2) the DCAR 34 does not count continuously, but counts in steps of P. The next repetitive comparison will typically give a positive non-zero value, which represents an error, since the comparison occurs after a step of counting P, so the DCAR value will typically exceed the ILR value. The DCAR 34 never stops counting, so that when the subtraction operation is performed, the excess in the DCAR 34 counter is kept. Since this excess value is non-zero, the time interval until the next occurrence of the subtraction operation is reduced. This time interval reduction provides an error compensation that will keep the average time interval between two succeeding high resolution pulses as close as possible to the ideal value.

At each subtraction operation, the CSM module 40 delivers one high resolution pulse. Since the counting rate of the DCAR 34 is $2^r$ times as fast as the DCCR 30, then the rate of high resolution pulses is normally $2^r$ times the rate of transition pulses developed by the encoder 24. In the case of the motor rotation, the counting of high resolution pulses gives a higher resolution of the position information.

Normally, upon generation of each high resolution pulse, the high resolution pulse data accumulation (HRPDA) register 37 is increased by 1. However, in accordance with the present invention, HRPDA register 37 is provided with a limiter 43 to limit the counting of high resolution pulses to $2^r-1$ pulses; i.e., the counting of the high resolution pulses is stopped if a further increment of the HRPDA register 37 would result in a change of bit r. The FRPDA register 37 does however, count each transition pulse, in the following manner: at each transition pulse, all least significant bits (0 to r−1) are reset to zero, and the counter value is incremented by $P=2^r$.

When the encoder 24 is rotating on motor shaft 22 at a fixed speed, the high resolution pulse rate is $2^r$ times the transition pulse rate. The HRPDA register 37 then contains a value with a higher resolution than if a simple pulse counter were used. If the motor speed is changing, such as during acceleration, some discontinuities in th HRPDA value can be seen sometimes. Normally, this only occurs for a very high acceleration rate, usually beyond the physical limitations of the application.

The variable divider circuit 28 divides the clock frequency, but the division is dependent on the motor speed, so that in the case of a slow motor speed, the transition detector 25 generates a low rate of transition pulses. In that case, the time between two transition pulses may be very long, and the various counting registers of the system may have to store too large a value, so that there is overflow. To avoid that situation, in accordance with the present invention, the variable divider circuit operates to select a number which it uses to divide the system clock input frequency, and this number is a power of 2, represented as $2^D$.

The divider selection (DS) circuit 29 selects the value of D using the highest bits of the ILR 32 register. If this highest ILR 32 register bit reaches a predetermined value, then the value of D is increased. The selection of the value of D is based on the value of the ILR register 32 for the previous transition interval. Since there is a physical limitation to the motor acceleration, there cannot be an instantaneous change in the transition interval value. Thus, changing the value of D based on the previous value prevents the overflow of the DCCR register 30.

An example of the selection rule applied by DS 29 for determining the value of D and thereby changing the divided clock pulse rate, is to consider the three highest bits in the ILR register 32 as a, n−1 and n−2. Each bit can have the value 0 or 1, meaning the bit is ZERO or SET. In the normal case, all three bits are ZERO, and the variable divider circuit establishes the clock rate at $C/2^D$, so that when D=0, since $2^D=1$, the clock counts at its normal rate C.

If the value of the n−1 bit is increased to 1 so that it is now SET, then the D is increased by one, and the clock rate becomes $C/2^1$, or C/2 which is one-half the previous rate. Thus, in response to a decrease in motor speed, DS 29 increases the value of D, and the clock rate is reduced for counting, since otherwise too many clock pulses would be generated, and an overflow condition will occur in the DCCR register 30. In contrast, as the motor speed increases, the value of D is decreased, so that the clock rate is increased, providing more clock pulses and more accurate resolution.

Figure 2:
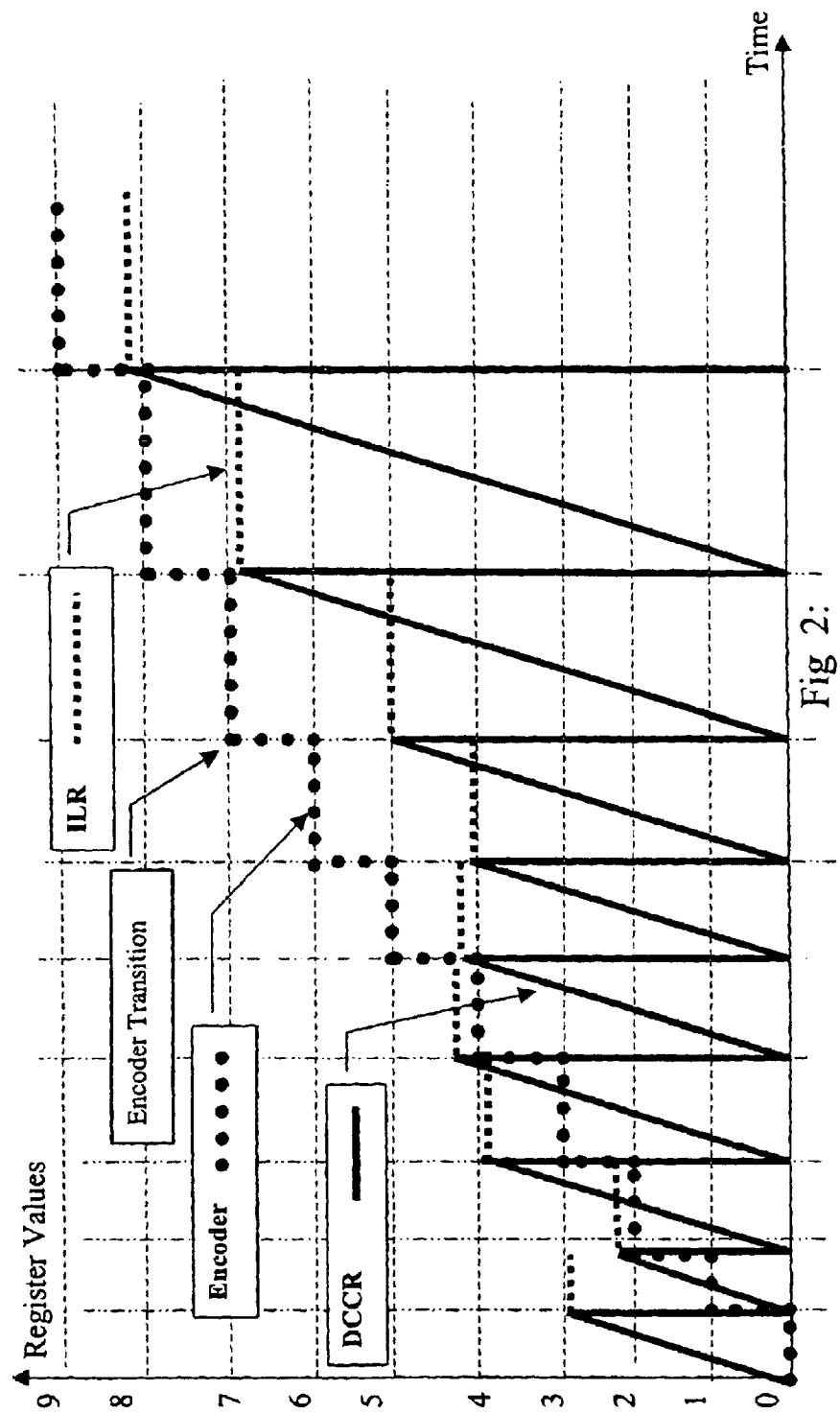
FIG. 2 is a timing diagram of the transitions of an encoder and counting registers used in the operation of the inventive sensor device.

Referring now to FIG. 2 there is shown a timing diagram of the transitions of an encoder and counting registers used in the operation of the inventive sensor device. As can be seen by reference to the diagram, the DCCR register 30 counts up between each encoder pulse transition (dark line), at which point its value is reset to zero. Before being reset, the value which DCCR register 30 reaches is retained in the ILK register 32 (small horizontal dots).

Figure 3:
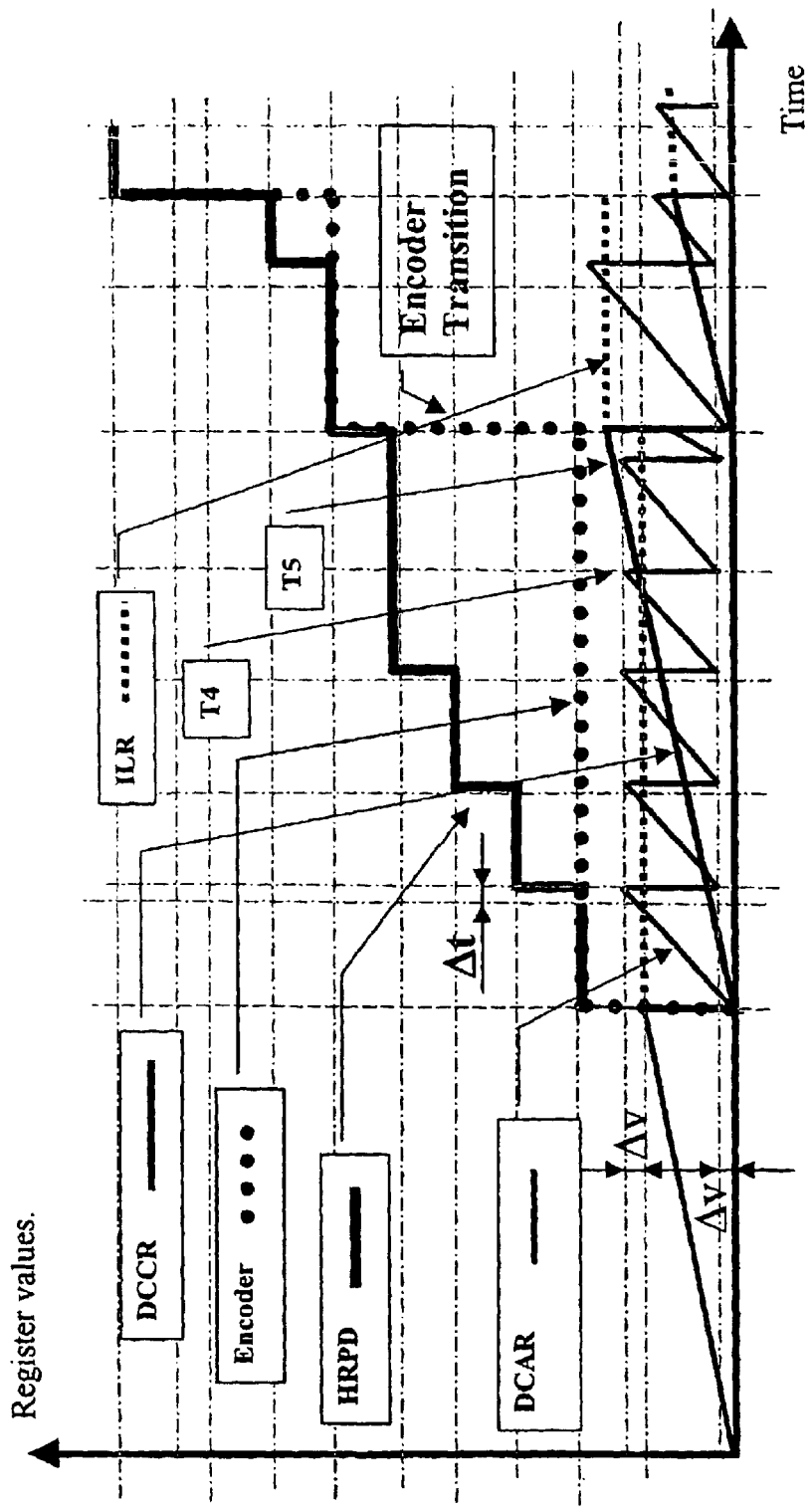
FIG. 3 is a timing diagram showing the development of a high resolution pulse in accordance with the operation of the registers of FIG. 2.

Referring now to FIG. 3, there is shown a timing diagram displaying development of a high resolution pulse in accordance with the operation of the registers of FIG. 2. In this particular example, r=2, so that $2^2=4$, and the high resolution pulse has a rate 4 times that of the transition pulse. Each time the DCAR 34 reaches the OL value, then one high resolution pulse is generated and the ILR value is subtracted from the DCAR 34 in the computation performed by the CSM module 40. As can be seen by reference to the diagram, since the counting rate of the DCAR 34 is 4 times as fast as the DCCR 30, then the rate of high resolution pulses is 4 times the rate of transition detector pulses. Thus, between two encoder transition pulses, the number of high resolution pulses will be, on average, 4 times greater than the count reached by the DCCR 30.

The HRPDA register counts separately the encoded pulses and the high resolution pulses, i.e., the HRPDA register value is composed of a number developed by the juxtaposition of two counters. For an example of r=4 and a 16 bit HRPDA register 37, bits 15 to 2 for the transition pulse counter value, and bits 0 and 1 for the high resolution pulse counter. The two counters are combined in one larger counter with the following properties:

1) High resolution counter (bits 0 and 1) is limited to its highest value. If the value of the high resolution pulses is larger than $2^{2-1}$, the counter remains at this value. This is shown in FIG. 3; T4 and T5 high resolution pulses are not counted;
2) At each transition pulse, the high resolution pulse counter is reset to zero.

The rate of generation of the high resolution pulse is based on the time interval between the last two transition pulses. Since this time interval varies with the motor speed, the number of high resolution pulses is dynamically adjusted to provide a high resolution prediction of the motor position.

As described previously, when the DCAR register 34 value reaches the ILR register 32 value, then in an ideal system it is reset to zero and starts counting again. In the preferred embodiment, the value of the ILR register 32 is subtracted from DCAR register 34. The CSM module 40, having a limited speed of operation, detects the DCAR 34 value reaching the ILR after some delay, Δt (FIG. 3) causing an error in the counting value ΔV. Since the CSM module 40 subtracts the ILR value from the DCAR 34, a remainder value ΔV is left in the DCAR 34, as shown in FIG. 3. In this fashion, after the subtraction operation, the DCAR 34 value is exactly the same value as in the ideal case without delay error Δt.

This eliminates the accumulation of the timing error of the high resolution pulse, as described earlier. Since the CSM module 40 is a physical system, it may take some time to make the subtraction calculation and the register-write data operation. During that time, divide clock pulses may continue to arrive, and if the DCAR register 34 were reset to zero, these clock pulses would have been lost, resulting in a timing error in the next high resolution pulse. Then the timing errors associated with each of the high resolution pulses would become cumulative, and the HRPDA register 37 would be counting slower than the desired value. In order to avoid this problem, the ILR register 32 value is only subtracted from the DCAR register 34, but the incoming divided clock pulses are continuously counted, so there is no accumulation of the timing error.

The entire approach of the present invention allows the design of a more accurate position sensor because there are more pulses than otherwise derived from the real encoder itself.

A feature of the approach described herein is that if the motor rotation is slow, the system clock pulses will generate a very high number between encoder transition pulses. In order to avoid this, the ITL internal latch register is monitored to see the amount of pulses which are being counted. If the number exceeds half the maximum value of pulses which can be stored in the ITL, then a variable divider circuit operates according to a divider selection command, and divides the system clock frequency in half so that there are less system clock pulses to work with in the same time interval.

An example of an application for this invention is to apply it where an encoder would generate 8000 pulses per revolution. There is typically an error between the motor position and the command indicating where the motor should be. The higher the resolution of the encoder, the less of this error introduced, but in order to achieve this, the inventive technique multiplies the transition pulses artificially. This multiplication of transition pulses enables a reduction in the position error, so that the position error is reduced ultimately by this inventive technique.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

What is claimed is:

1. A sensor device for measuring a changing variable of a system and providing output values representing the system variable with increased resolution, said device comprising:

means for providing a pulse with each transition of the measured variable over a level of each of a set of regularly spaced apart predetermined levels, means for generating a train of system clock pulses at a first rate and a train of divided system clock pulses at a fraction of said first rate;

first means for counting a first number of pulses of said divided system clock pulse train occurring between each occurrence of said transition pulse;

means for storing said first counted number of pulses of said divided system clock pulse train;

second means for counting a second number of pulses of said divided system clock pulse train, and resetting said second counted number upon each transition pulse;

second means for storing said second counted number of pulses of said divided system clock pulse train, in a register at a shifted storage position representing a multiple of said second counted number of pulses;

means for repeatedly comparing, at a relatively high rate, said shifted, stored second counted number and said stored first counted number and producing a difference count therebetween if the former exceeds the latter;

means for generating a high resolution pulse upon replacing said shifted, stored second counted number with said difference count in said register, thus providing several high resolution pulses between transition pulses; and means for calculating the system variable by counting the number of high resolution pulses in the interval between occurrences of said transition pulses.

2. The device of claim 1 wherein said system variable is represented by the angular position of a shaft of a motor.

3. The device of claim 1 wherein said system variable is a linear position sensor.

4. The device of claim 1 wherein said means for generating said system clock pulses comprises an adjustable frequency generator.

5. The device of claim 4 wherein said adjustable frequency generator comprises a frequency divider.

6. The device of claim 5 wherein said frequency divider operates with a dividing ratio which is increased each time said first counted number exceeds a first threshold value.

7. The device of claim 5 wherein said frequency divider operates with a dividing ratio which is decreased each time said first counted number falls below a second threshold value.

8. The device of claim 1 wherein said calculating means comprises two juxtaposed counters, a first counter for counting said high resolution pulses and a second counter for counting said transition pulses.

9. The device of claim 8 wherein said first juxtaposed counter can count up to a value limited to a maximum value so as not to enable overflow.

10. The device of claim 8 wherein said first juxtaposed counter is reset with each occurrence of said transition pulse.

11. A position sensor device for controlling the position of a motor, said device comprising:

encoder means for providing a pulse with each transition of the motor shaft position over a rotation position interval;

means for generating a train of system clock pulses at a first rate and a train of divided system clock pulses at a fraction of said first rate;

first means for counting a first number of pulses of said divided system clock pulse train occurring between each occurrence of said transition pulse;

means for storing said first counted number of pulses of said divided system clock pulse train;

second means for counting a second number of pulses of said divided system clock pulse train, and resetting said second counted number upon each transition pulse;

second means for storing said second counted number of pulses of said divided system clock pulse train, in a register at a shifted storage position representing a multiple of said second counted number of pulses;

means for repeatedly comparing, at a relatively high rate, said shifted, stored second counted number and said stored first counted number and producing a difference count therebetween if the former exceeds the latter;

means for generating a high resolution pulse upon replacing said shifted stored second counted number with said difference count in said register, thus providing several high resolution pulses between transition pulses; and means for calculating the motor shaft position by counting the number of high resolution pulses in the interval between occurrences of said transition pulses.

12. A method for measuring a changing variable of a system and providing output values representing the system variable with increased resolution, said method comprising the steps of:

providing a pulse with each transition of the measured variable over a level of each of a set of regularly spaced apart predetermined levels, generating a train of system clock pulses;

counting a first number of system clock pulses between the last two occurrences of said transition pulse;

counting a second number of said system clock pulses at a multiple rate starting at each transition pulse;

repeatedly comparing said second and first number of pulses, and generating a high resolution pulse if said second counted number exceeds said first counted number; and calculating the system variable by counting the number of high resolution pulses in the interval between occurrences of said transition pulses.

13. A method for measuring a motor shaft position, said method comprising the steps of:

providing a pulse with each transition of the motor shaft position over a rotation position interval;

generating a train of system clock pulses;

counting a first number of system clock pulses between the last two occurrences of said transition pulse;

counting a second number of said system clock pulses at a multiple rate starting at each transition pulse;

repeatedly comparing, at a relatively high rate, said second and first number of pulses, and generating a high resolution pulse if said, second counted number exceeds said first counted number; and calculating the motor shaft position by counting the number of high resolution pulses in the interval between occurrences of said transition pulses.

\* \* \* \* \*